(12) United States Patent
Kocher

(10) Patent No.: US 6,856,875 B2
(45) Date of Patent: Feb. 15, 2005

(54) METHOD FOR REACHING A RELEASE DECISION FOR RETAINING MEANS

(75) Inventor: Pascal Kocher, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/344,642
(22) PCT Filed: Aug. 3, 2001
(86) PCT No.: PCT/DE01/02966
§ 371 (c)(1), (2), (4) Date: Jul. 28, 2003
(87) PCT Pub. No.: WO02/14113
PCT Pub. Date: Feb. 21, 2002

(65) Prior Publication Data
US 2004/0031637 A1 Feb. 19, 2004

(30) Foreign Application Priority Data
Aug. 17, 2000 (DE) .......................................... 100 40 111

(51) Int. Cl.$^7$ .................................................. G06F 7/00
(52) U.S. Cl. ............................. 701/45; 701/46; 180/271
(58) Field of Search .............................. 701/45, 46, 47; 180/271, 282; 280/728.1; 340/435, 436, 438, 667, 669

(56) References Cited

U.S. PATENT DOCUMENTS

| 5,185,701 A | | 2/1993 | Blackburn et al. ............ 701/45 |
| 5,835,007 A | * | 11/1998 | Kosiak ........................ 340/436 |
| 5,949,363 A | | 9/1999 | Keyse et al. ................. 341/173 |
| 5,964,817 A | | 10/1999 | Wessels et al. ............... 701/45 |
| 6,725,141 B2 | * | 4/2004 | Roelleke ....................... 701/45 |
| 2003/0155753 A1 | * | 8/2003 | Breed ......................... 280/735 |

FOREIGN PATENT DOCUMENTS

| DE | 44 45 996 | 6/1996 |
| EP | 0 458 796 | 5/1995 |
| EP | 0 987 151 | 3/2000 |
| WO | 00 13944 | 3/2000 |

* cited by examiner

Primary Examiner—Gertrude A. Jeanglaude
(74) Attorney, Agent, or Firm—Kenyon & Kenyon

(57) ABSTRACT

In order to achieve a robust triggering decision for restraint devices in a vehicle, the difference is determined from chronologically offset measured acceleration values, and the absolute value of the difference is then integrated. The integral is compared to at least one threshold value, and if the integral then does not exceed the at least one threshold value prior to one or more definable points in time during the course of the crash, the location of a triggering threshold for the measured acceleration or for a velocity change derived therefrom is modified so that the triggering sensitivity becomes less.

4 Claims, 2 Drawing Sheets

METHOD FOR REACHING A RELEASE DECISION FOR RETAINING MEANS

FIELD OF THE INVENTION

The present invention relates to a method for creating a triggering decision for restraint means in a vehicle, the acceleration of the vehicle being measured and the measured acceleration or a velocity change derived therefrom being compared to a triggering threshold, and an exceedance of the triggering threshold resulting in a triggering of the restraint means, the triggering threshold curve and thus the triggering sensitivity being selected as a function of an ascertained crash severity.

BACKGROUND INFORMATION

A method for creating a triggering decision for restraint means is known from European Patent No. EP 0 458 796. In the case of the triggering algorithm described in this document, the triggering threshold curve depends on the measured acceleration. Triggering situations can be distinguished from non-triggering situations by suitable selection of the triggering threshold. Specifically, the triggering of restraint means (e.g. airbags, belt tensioners) is to be prevented when the vehicle experiences only a minor crash or, for example, drives over railroad tracks or curbs, in which context the vehicle occupants are not exposed to any risk of injury. In severe crashes that in any case present a risk of injury to the vehicle occupants, on the other hand, triggering of the restraint means is to be absolutely guaranteed. Since there is a very fine distinction between crashes that require triggering of the restraint means and crashes in which no triggering should occur, it may certainly happen that an incorrect decision is made regarding triggering or non-triggering of the restraint means. In order to achieve a faster and more robust triggering decision in vehicle crashes, it is described in German Patent No. DE 44 45 996, as stated initially, that the triggering threshold curve and thus the triggering sensitivity be selected as a function of an ascertained crash severity. For that purpose, a frequency analysis of the measured acceleration is performed here, and the dominant components in the spectrum of the acceleration signal are selected and appropriately evaluated. The integration of the acceleration signal is influenced as a function of this frequency analysis of the acceleration signal, in that the acceleration to be integrated is more heavily weighted in critical situations, so that a triggering threshold is exceeded more quickly.

It is an object of the present invention to provide a method of the kind cited initially with which, by comparison with the existing art, an even more reliable and robust triggering decision for restraint means can be made.

SUMMARY OF THE INVENTION

According to the present invention, the difference is determined from chronologically offset measured acceleration values; the absolute value of the difference is integrated; the integral is compared to at least one threshold value; and if the integral does not exceed the at least one threshold value prior to one or more definable points in time during the course of the crash, the triggering threshold curve is modified so that the triggering sensitivity becomes less.

The approach used in this method for ascertaining the crash severity, on the basis of which the location of the triggering threshold can then be influenced, makes possible a very reliable distinction between triggering crashes and non-triggering crashes. This is because the integral of the difference from chronologically offset measured acceleration values is an indication of the mechanical deformation of the vehicle in a crash, and on the basis of the mechanical deformation it is possible to identify very accurately whether the crash is a triggering or a non-triggering one. In a triggering crash, many mechanical parts break in the front part of the vehicle; this can be recognized in the acceleration signal by way of high-frequency signal components. In a non-triggering crash, on the other hand, mechanical parts of the vehicle are almost undamaged; less mechanical deformation occurs, resulting in fewer high-frequency acceleration signal components. The method according to the present invention makes the high- and low-frequency components in the acceleration signal detectable, thereby enabling a robust decision between triggering and non-triggering crashes.

It is advisable for the at least one threshold value and the point(s) in time for the threshold value comparison of the integral to be defined as a function of vehicle model.

The chronologically offset measured acceleration values are advantageously acquired by the fact that the measured acceleration is written into a loop memory, and the difference is determined in each case from the first and the last acceleration value written into the loop memory.

The triggering threshold whose location is modified as a function of the ascertained crash severity advantageously has a curve that depends on the measured acceleration.

DETAILED DESCRIPTION

Figure 1:
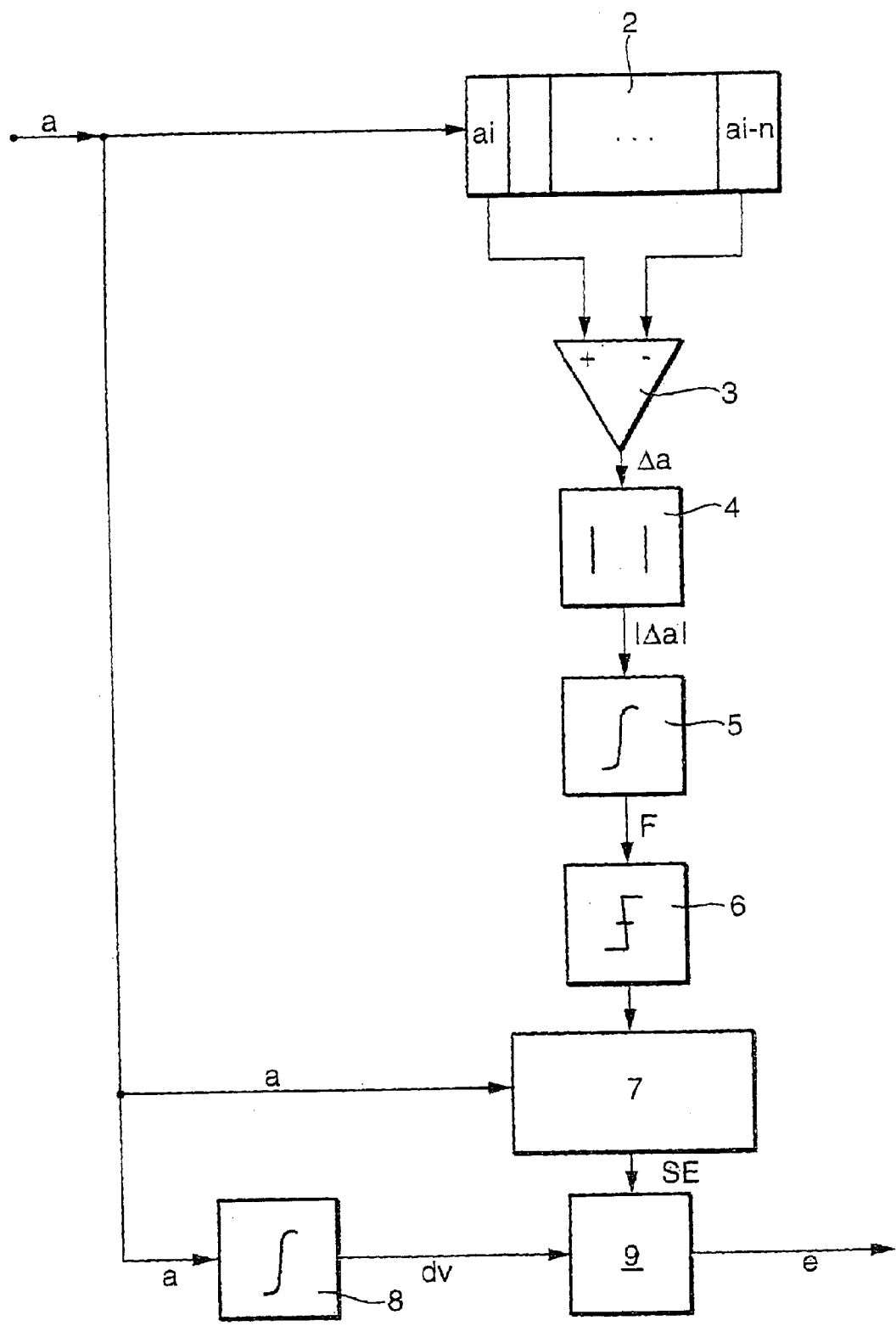
FIG. 1 is a block diagram illustrating the creation of a triggering decision.

As is evident from FIG. 1, acceleration a measured in the vehicle, e.g. the acceleration in the longitudinal direction of the vehicle, is forwarded to a loop memory 2. Loop memory 2 is made up, in known fashion, of multiple memory locations in which individually chronologically sequential measured acceleration values ai through ai-n are written. The elapsed time between first measured acceleration value ai-n and last measured acceleration value ai depends on the size, i.e. the number of memory cells, of the loop memory. The size of the time window of the measured acceleration signal a that is considered, i.e. the elapsed time between first acceleration value ai-n and last acceleration value ai written into loop memory 2, governs which frequency region of acceleration signal a will be considered. Selection of the frequency region is based substantially on the vehicle model for which a triggering decision needs to be created.

The two measured acceleration values ai and ai-n are conveyed to a circuit block 3 that determines difference $\Delta a$ between these two measured values. In the next block 4, the absolute value of difference $|\Delta a|$ is calculated.

Figure 2:
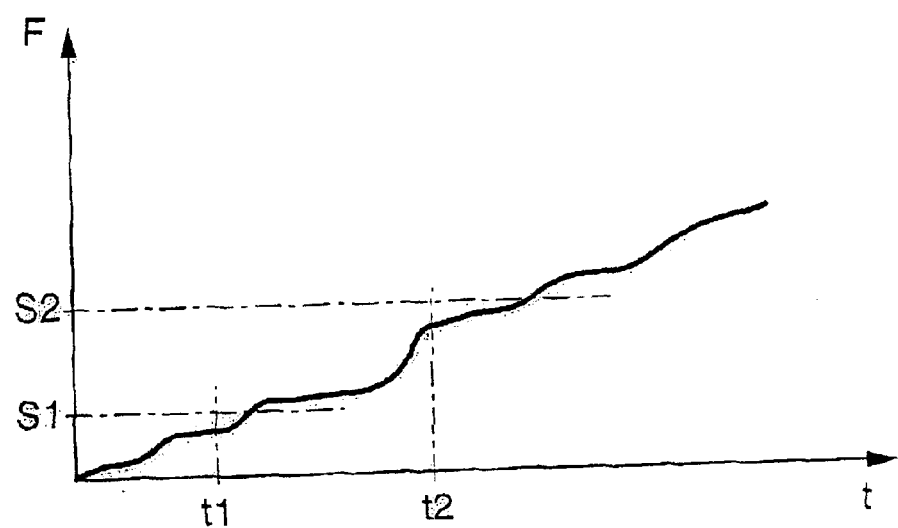
FIG. 2 shows the change over time in the integral of the difference determined from measured acceleration values.

In circuit block 5, the absolute value of difference $|\Delta a|$ is integrated onto the chronologically offset acceleration signal values. The result of this integration, namely the signal $F = \int |\Delta a| dt$ is depicted in FIG. 2.

In circuit block 6, a threshold value decision is made for output signal F of integrator 5, two fixed threshold values S1 and S2 being defined. In the context of the threshold value decision in circuit block 6, integral F is checked, prior to predefined points in time t1 and t2 after the beginning of the crash, for exceedance of threshold values S1 and S2. Prior to the earlier point in time t1, a comparison is made of the integral F with the lower threshold value S1, and prior to the later point in time t2 with the higher threshold value S2. The optimum locations for points in time t1 and t2, and for threshold values S1 and S2, are ascertained empirically from the standpoint of a reliable and robust decision between non-triggering and triggering crashes for the particular vehicle model. In the exemplified embodiment depicted in FIG. 2, integral F does not exceed first threshold value S1 prior to point in time t1, nor does it exceed second threshold S2 prior to point in time t2. This curve for integral F indicates, with a high level of certainty, that this is a non-triggering crash in which only minor mechanical deformation of the vehicle bodywork is taking place. If the two threshold values S1 and S2 had been exceeded by integral F prior to point in times t1 and t2, respectively, a triggering crash, which would have resulted in severe mechanical deformation of the vehicle bodywork, would definitely have existed.

Figure 3:
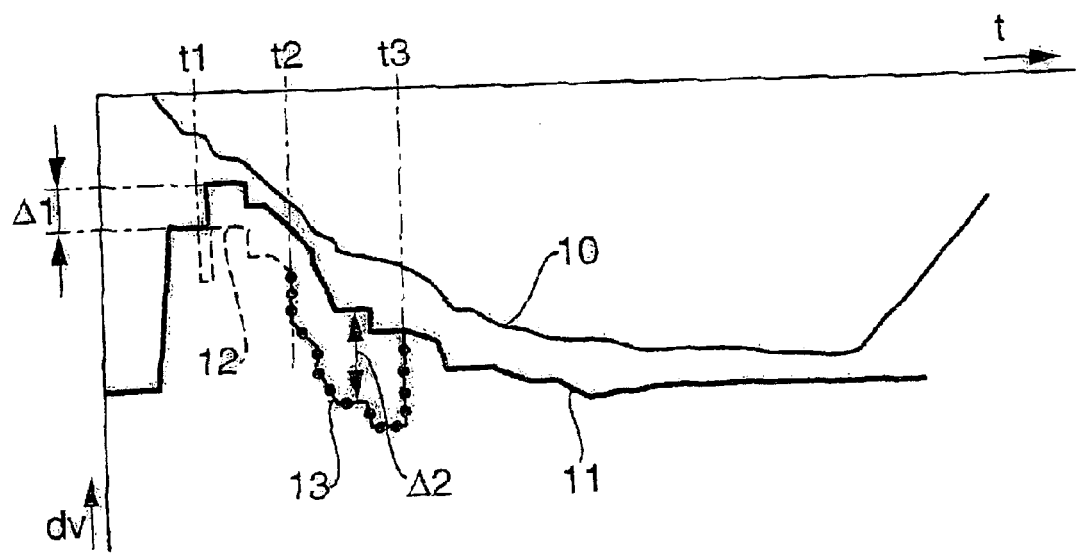
FIG. 3 shows the curves for a measured velocity change, and triggering thresholds.

FIG. 3 depicts a curve 10 for velocity change dv that results from integration of acceleration signal a in circuit block 8. In circuit block 9, this velocity change dv is compared to a triggering threshold SE that is ascertained in circuit block 7. If it is found in circuit block 9 that velocity change dv exceeds the triggering threshold SE generated by circuit block 7, a triggering decision e is outputted to a control unit (not depicted) for restraint means in the vehicle. In circuit block 7, a threshold that can have, for example, the curve 11 indicated in FIG. 3 is calculated as a function of measured acceleration a. Calculation of a triggering threshold as a function of measured acceleration a is described, for example, in European Patent No. EP 0 458 796 cited above. A triggering threshold curve ascertained in this fashion has the advantage that improper triggering of the restraint means is avoided to the greatest possible extent.

If circuit block 6 determines, in the decision as to the threshold value of integral F, that first threshold value S1 was not exceeded prior to point in time t1, then in circuit block 7 the triggering threshold for that point in time t1 is shifted by a magnitude $\Delta 1$ in such a way that the spacing between the triggering threshold and curve 10 of velocity change dv is increased by that magnitude $\Delta 1$. This decreases the probability that velocity change dv will exceed the new triggering threshold 12 (depicted as a dashed line in the Figure), so that triggering of the restraint systems in a non-triggering crash is prevented with a high level of certainty. If integral F also does not exceed second threshold value S2 prior to time t2, then as of point in time t2 the triggering threshold is shifted by an even greater magnitude $\Delta 2$ so that the spacing of curve 10 for velocity change dv from the new triggering threshold 13 (drawn as a dot-dash line in the Figure) becomes even greater. The certainly that the triggering threshold of velocity change dv will not be exceeded in a non-triggering crash is thereby increased even further. For example, if integral F exceeded upper threshold value S2 before point in time t2, the triggering threshold would continue to extend at a spacing $\Delta 1$, as shown by dashed curve 12, from the originally calculated triggering threshold 11.

Instead of defining only two discrete threshold values S1 and S2 for integral F, it is also possible to define several discrete threshold values, or in the simplest case even only one discrete threshold value. Integral F can also be compared to a threshold value characteristic curve that has a time-dependent course. In this case the spacing of a newly calculated triggering threshold from the originally calculated triggering threshold 11 would change continuously over time. The outlay in terms of calculation and memory capacity necessary for this would be considerably greater than when working, as depicted in the exemplified embodiment, with a few discrete threshold values.

Instead of velocity change dv as depicted in FIG. 3, it would also be possible to compare the measured acceleration signal directly to a triggering threshold in order to arrive at a triggering decision e.

What is claimed is:

1. A method for creating a triggering decision for at least one restraint device in a vehicle, comprising:

measuring an acceleration of the vehicle;

comparing one of (a) the measured acceleration and (b) a velocity change derived from the measured acceleration to a triggering threshold;

triggering the restraint device in response to an exceedance of the triggering threshold;

selecting a curve of the triggering threshold and a triggering sensitivity as a function of an ascertained crash severity;

determining a difference from chronologically offset measured acceleration values;

integrating an absolute value of the difference;

comparing the integral to at least one threshold value; and if the integral does not exceed the at least one threshold value prior to at least one defined point in time during a course of a crash, modifying the curve of the triggering threshold in such a way that the triggering sensitivity becomes less.

2. The method according to claim 1, wherein the at least one threshold value and the at least one point in time are defined as a function of a model of the vehicle.

3. The method according to claim 1, further comprising writing the measured acceleration into a loop memory, and wherein the difference is determined in each case from a first acceleration value and a last acceleration value written into the loop memory.

4. The method according to claim 1, wherein the curve of the triggering threshold depends on the measured acceleration.

* * * * *